United States Patent
Moskowitz et al.

(10) Patent No.: US 12,258,683 B2
(45) Date of Patent: Mar. 25, 2025

(54) PROCESS FOR PREPARING CARBON FIBERS FROM LOW POLYDISPERSITY POLYACRYLONITRILE

(71) Applicant: Cytec Industries Inc., Princeton, NJ (US)

(72) Inventors: Jeremy Moskowitz, Mauldin, SC (US); Thomas Taylor, Greenville, SC (US); Amy Tucker, Central, SC (US); Eric Gladden, Easley, SC (US); Billy Harmon, Simpsonville, SC (US)

(73) Assignee: CYTEC INDUSTRIES INC., Princeton, NJ (US)

( * ) Notice: Subject to any disclaimer, the term of this patent is extended or adjusted under 35 U.S.C. 154(b) by 585 days.

(21) Appl. No.: 17/607,488

(22) PCT Filed: May 1, 2020

(86) PCT No.: PCT/US2020/030983
§ 371 (c)(1),
(2) Date: Oct. 29, 2021

(87) PCT Pub. No.: WO2020/223614
PCT Pub. Date: Nov. 5, 2020

(65) Prior Publication Data
US 2022/0195627 A1    Jun. 23, 2022

Related U.S. Application Data

(60) Provisional application No. 62/842,138, filed on May 2, 2019.

(51) Int. Cl.
| | |
|---|---|
| *D01D 5/06* | (2006.01) |
| *C01B 32/05* | (2017.01) |
| *D01D 5/14* | (2006.01) |
| *D01F 9/22* | (2006.01) |

(52) U.S. Cl.
CPC .............. *D01D 5/06* (2013.01); *C01B 32/05* (2017.08); *D01D 5/14* (2013.01); *D01F 9/225* (2013.01)

(58) Field of Classification Search
USPC .................................. 264/178 R, 178 F, 183
See application file for complete search history.

(56) References Cited

U.S. PATENT DOCUMENTS

| | | | | |
|---|---|---|---|---|
| 4,115,503 A | * | 9/1978 | Bach ..................... | D01F 6/78 |
| | | | | 264/210.8 |
| 9,957,645 B2 | | 5/2018 | Tang et al. | |
| 10,189,985 B2 | | 1/2019 | Tang et al. | |
| 2015/0322593 A1 | | 11/2015 | Irisawa et al. | |

FOREIGN PATENT DOCUMENTS

| | | |
|---|---|---|
| CN | 109440214 A | 3/2019 |
| CN | 110078860 A | 8/2019 |
| JP | H11107034 A | 4/1999 |
| JP | 2017503066 A | 1/2017 |
| JP | 2018508667 A | 3/2018 |
| KR | 101252789 B1 | 4/2013 |
| KR | 1020140148343 A | 12/2014 |
| WO | 2014138807 A1 | 9/2014 |
| WO | 2016144488 A1 | 9/2016 |

OTHER PUBLICATIONS

5 Rejection Decision issued in Chinese Application No. 202080048745.9 mailed on Oct. 24, 2023 (5 pages).
Zeng et al.; "Investigating the Jet Stretch in the Wet Spinning of PAN Fiber;" Journal of Applied Polymer Science; vol. 106; 2007; pp. 2267-2273 (7 pages).
Zeng et al.; "Investigation the Jet Stretch in PAN Fiber Dry-Jet Wet Spinning for PAN-DMSO-H2O System;" Journal of Applied Polymer Science; vol. 114; 2009; pp. 3621-3625 (5 pages).
Notice of Reasons for Refusal issued in Japanese Application No. JP2021-564827 mailed on Aug. 20, 2024 (6 pages).

* cited by examiner

*Primary Examiner* — Christopher T Schatz
(74) *Attorney, Agent, or Firm* — Thi Dang

(57) ABSTRACT

The present disclosure relates to a process for producing one or more carbon fiber precursor fibers, particularly by spinning a polymer solution, wherein the polymer has a polydispersity (PDI) of less than or equal to 2, in a coagulation bath with a jet stretch of about 5 to about 60. The one or more carbon fiber precursor fibers produced may be used for producing carbon fiber, typically carbon fiber used in manufacturing composite materials.

10 Claims, No Drawings

PROCESS FOR PREPARING CARBON FIBERS FROM LOW POLYDISPERSITY POLYACRYLONITRILE

CROSS REFERENCE TO RELATED APPLICATIONS

This application is a U.S. national phase entry under 35 U.S.C. § 371 of International Application No. PCT/US2020/030983, filed on May 1, 2020, which claims the priority of U.S. Provisional Application No. 62/842,138, filed May 2, 2019. The entire contents of these applications are explicitly incorporated herein by this reference.

FIELD OF THE INVENTION

The present disclosure relates generally to the preparation of carbon fiber precursor fibers from low polydispersity polyacrylonitrile-based polymers. The carbon fiber precursor fibers prepared by the described process may be incorporated into a process for producing carbon fiber, typically carbon fiber used in manufacturing composite materials.

BACKGROUND

Carbon fibers have been used in a wide variety of applications because of their desirable properties, such as high strength and stiffness, high chemical resistance and low thermal expansion. For example, carbon fibers can be formed into a structural part that combines high strength and high stiffness, while having a weight that is significantly lighter than a metal component of equivalent properties. Increasingly, carbon fibers are being used as structural components in composite materials for aerospace and automotive applications, among others. In particular, composite materials have been developed wherein carbon fibers serve as a reinforcing material in a resin or ceramic matrix.

Carbon fiber from acrylonitrile is generally produced by a series of manufacturing steps or stages, including polymerization, spinning, drawing and/or washing, oxidation, and carbonization. Polyacrylonitrile (PAN) polymer is currently the most widely used precursor for carbon fibers. During the polymerization stage, acrylonitrile (AN), optionally with one or more comonomers, is converted into PAN polymer.

With over 90% of carbon fiber being derived from PAN polymer, it is important to identify controllable parameters in the polymer properties that impact downstream processes with an aim towards faster production, lower cost, and/or easier manufacture of carbon fiber, especially large-tow carbon fiber. In the spinning of PAN polymer "dope" into carbon fiber precursor fibers (also referred to as "white fibers"), a significant problem is the processability of the viscous dope solution. Generally, the conditions, such as jet speed and spinneret design, used in spinning, particularly air gap spinning, are limited by the polymer's ability to withstand such conditions. For instance, it has been a challenge to spin more than 3,000 filaments at a time by air gap spinning due to limitations in the filament strength in the air gap, limitations in the ability to prevent wetfacing, and the tendency for filament-to-filament interference at higher capillary densities typical of >3,000-filament air gap spinning.

Thus, there is an ongoing need for processes for preparing carbon fiber precursor fibers that have the ability to withstand jet stretch in higher tow counts without bath wetfacing and filament-to-filament interference, especially for large-tow (>3,000-filament) air gap spinning, and provide the opportunity to re-design spinnerets with lower L/D in the capillary to have less pressure at the spinneret head.

SUMMARY OF THE INVENTION

This objective, and others which will become apparent from the following detailed description, are met, in whole or in part, by the processes of the present disclosure.

In a first aspect, the present disclosure relates to a process for producing one or more carbon fiber precursor fibers, the process comprising:
  spinning a polymer solution, wherein the polymer has a polydispersity (PDI) of less than or equal to 2, in a coagulation bath with a jet stretch of about 5 to about 60, thereby producing the one or more carbon fiber precursor fibers.

In a second aspect, the present disclosure relates to a process for producing carbon fibers, the process comprising:
  1) producing carbon fiber precursor fibers according to the process described herein;
  2) drawing the carbon fiber precursor fibers produced in step 1) through one or more draw and wash baths, thereby forming drawn carbon fiber precursor fibers that are substantially free of solvent; and
  3) oxidizing the drawn carbon fiber precursor fibers of step 2) to form stabilized carbon fiber precursor fibers and then carbonizing the stabilized carbon fiber precursor fiber, thereby producing carbon fibers.

DETAILED DESCRIPTION

As used herein, the terms "a", "an", or "the" means "one or more" or "at least one" and may be used interchangeably, unless otherwise stated.

As used herein, the term "comprises" includes "consists essentially of" and "consists of." The term "comprising" includes "consisting essentially of" and "consisting of."

Unless defined otherwise, all technical and scientific terms used herein have the same meaning as is commonly understood by one of skill in the art to which this specification pertains.

As used herein, and unless otherwise indicated, the term "about" or "approximately" means an acceptable error for a particular value as determined by one of ordinary skill in the art, which depends in part on how the value is measured or determined. In certain embodiments, the term "about" or "approximately" means within 1, 2, 3, or 4 standard deviations. In certain embodiments, the term "about" or "approximately" means within 50%, 20%, 15%, 10%, 9%, 8%, 7%, 6%, 5%, 4%, 3%, 2%, 1%, 0.5%, or 0.05% of a given value or range.

Also, it should be understood that any numerical range recited herein is intended to include all sub-ranges subsumed therein. For example, a range of "1 to 10" is intended to include all sub-ranges between and including the recited minimum value of 1 and the recited maximum value of 10; that is, having a minimum value equal to or greater than 1 and a maximum value of equal to or less than 10. Because the disclosed numerical ranges are continuous, they include every value between the minimum and maximum values. Unless expressly indicated otherwise, the various numerical ranges specified in this application are approximations.

The first aspect of the present disclosure relates to a process for producing one or more carbon fiber precursor fibers, the process comprising:
  spinning a polymer solution, wherein the polymer has a polydispersity (PDI) of less than or equal to 2, in a coagulation bath with a jet stretch of about 5 to about 60, thereby producing the one or more carbon fiber precursor fibers.

As used herein, the term "precursor fiber" refers to a fiber comprising a polymeric material that can, upon the application of sufficient heat, be converted into a carbon fiber having a carbon content that is about 90% or greater, and in particular about 95% or greater, by weight. Such fibers are also known as "white fibers".

The polymer solution used in the process described herein comprises a polyacrylonitrile-based polymer, typically a polyacrylonitrile-based polymer having a polydispersity (PDI) of less than or equal to 2, and a solvent for the said polymer.

The polyacrylonitrile-based polymer may be a homopolymer or may comprise repeating units derived from comonomers. Such repeating units may be derived from suitable comonomers including, but not limited to, vinyl-based acids, such as methacrylic acid (MAA), acrylic acid (AA), and itaconic acid (ITA); vinyl-based esters, such as methacrylate (MA), ethyl acrylate (EA), butyl acrylate (BA), methyl methacrylate (MMA), ethyl methacrylate (EMA), propyl methacrylate, butyl methacrylate, β-hydroxyethyl methacrylate, dimethylaminoethyl methacrylate, 2-ethylhexylacrylate, isopropyl acetate, vinyl acetate (VA), and vinyl propionate; vinyl amides, such as vinyl imidazole (VIM), acrylamide (AAm), and diacetone acrylamide (DAAm); vinyl halides, such as allyl chloride, vinyl bromide, vinyl chloride and vinylidene chloride; ammonium salts of vinyl compounds and sodium salts of sulfonic acids, such as sodium vinyl sulfonate, sodium α-styrene sulfonate (SSS), sodium methallyl sulfonate (SMS), and sodium-2-acrylamido-2-methyl propane sulfonate (SAMPS), among others.

In an embodiment, the polymer comprises repeating units derived from acrylonitrile and one or more co-monomers selected from the group consisting of methacrylic acid (MAA), acrylic acid (AA), itaconic acid (ITA), vinyl-based esters, typically, methacrylate (MA), methyl methacrylate (MMA), vinyl acetate (VA), ethyl acrylate (EA), butyl acrylate (BA), ethyl methacrylate (EMA); and other vinyl derivatives, typically, vinyl imidazole (VIM), acrylamide (AAm), and diacetone acrylamide (DAAm); and mixtures thereof.

The comonomer ratio (amount of one or more comonomers to amount of acrylonitrile) is not particularly limited. However, a suitable comonomer ratio is 0 to 20%, typically 1 to 5%, more typically 1 to 3%.

The polymer can be obtained from a commercial source or synthesized according to any polymerization method known to those of ordinary skill in the art. Exemplary synthesis methods include, but are not limited to, solution polymerization, dispersion polymerization, precipitation polymerization, suspension polymerization, emulsion polymerization, and variations thereof, such as, for example, RAFT polymerization.

One suitable method for synthesizing the polymer comprises mixing acrylonitrile (AN) monomer and a co-monomer described herein, in a solvent in which the polymer is soluble, thereby forming a solution. The solution is heated to a temperature above room temperature (i.e., greater than 25° C.). After heating, an initiator is added to the solution to initiate the polymerization reaction. Once polymerization is completed, unreacted AN monomers are stripped off (e.g., by de-aeration under high vacuum) and the resulting PAN polymer solution is cooled down. At this stage, the polymer is in a solution, or dope, form.

Examples of suitable solvents include, but are not limited to, dimethyl sulfoxide (DMSO), dimethyl formamide (DMF), dimethyl acetamide (DMAc), ethylene carbonate (EC), zinc chloride ($ZnCl_2$)/water and sodium thiocyanate (NaSCN)/water.

In another suitable method, the acrylonitrile (AN) monomer and a co-monomer described herein may be polymerized in a medium, typically aqueous medium, in which the resulting polymer is sparingly soluble or non-soluble. In this manner, the resulting polymer would form a heterogenous mixture with the medium. The polymer is then filtered and dried. When such a method is used, the dried polymer is dissolved in a suitable solvent, such as one or more of the solvents described herein.

Suitable initiators, also referred to as radical initiators or catalysts, for the polymerization include, but are not limited to, azo-based compounds, such as azo-bisisobutyronitrile (AIBN), 2,2'-azobis[2-(2-imidazolin-2-yl)propane]dihydrochloride, 2,2'-azobis(2-methylpropionamidine)dihydrochloride, 2,2'-azobis[N-(2-carboxyethyl)-2-methylpropionamidine]tetrahydrate, 2,2'-azobis[2-(2-imidazolin-2-yl) propane], 2,2'-azobis[2-methyl-N-(2-hydroxyethyl) propionamide], 4,4'-azobis(4-cyanovaleric acid), 2,2'-azobis-(2,4-dimethyl) valeronitrile (ABVN), among others; and organic peroxides, such as dilauroyl peroxide (LPO), di-tert-butyl peroxide (TBPO), diisopropyl peroxydicarbonate (IPP), among others. The radical initiator is typically used in an amount of from about 0.6 wt % to about 1.8 wt %, relative to the amount of acrylonitrile.

The reaction temperature is generally above room temperature (i.e., greater than 25° C.). Suitably, the reaction is maintained at a temperature of from about 30° C. to about 85° C., typically about 40° C. to about 85° C., more typically from about 58° C. to about 72° C.

In an embodiment, the polymer is synthesized by controlled/living radical polymerization using a Reversible Addition/Fragmentation Chain Transfer, or RAFT, agent.

As known to those of ordinary skill in the art, living polymerization refers to a polymerization process in which chain termination occurs only after all the monomers are consumed during radical polymerization. In this type of polymerization reaction, the propagation can continue if more monomer is added to the reaction. Ideally, all chains are initiated at the beginning of the reaction and grow at a similar rate. There is no irreversible chain transfer or termination. If initiation is rapid with respect to propagation, the molecular weight distribution is very narrow and the chains can be extended by further adding monomers into the reaction. However, in typical radical polymerization, all chains cannot be simultaneously active. Therefore, a reagent is used to control the propagation and its rate by forming a dormant stage. By reversibly de-activating or activating the propagation, a rapid equilibrium between the active and dormant chains can be achieved thereby controlling the chain growth at a similar rate such that narrow molecular weight distributions can be obtained. Such a polymerization process is referred to as controlled/living radical polymerization and the reagent used to control the propagation is referred to as a Reversible Addition/Fragmentation Chain Transfer, or RAFT, agent.

RAFT agents are known to those of ordinary skill in the art and include, but are not limited to, carbon tetrachloride ($CCl_4$), carbon tetrabromide ($CBr_3$), bromotrichloromethane ($BrCCl_3$), pentaphenylethane, compounds having one or more—SH functional groups (also called mercaptans or thiols), such as dodecyl mercaptan, and compounds having one or more—(C=S)—S—and/or —S—S—functional groups, such as RAFT agents disclosed in U.S. Pat. Nos. 9,957,645 and 10,189,985 to Longgui Tang, et al, which are incorporated herein by reference.

The concentration of polymer in the polymer solution (also called spin "dope") is not particularly limited, but may be at least 10 wt %, typically from about 16 wt % to about 28 wt % by weight, more typically from about 19 wt % to about 24 wt %, based on total weight of the solution.

The pH of the polymer solution is not particularly limited. The pH may be adjusted to aid in spinning according to methods known to those of ordinary skill in the art, for example, by adding suitable acids or bases to the polymer solution.

Due to the different termination mechanisms of different polymerization reactions that may be used to produce the polymers used according to the present disclosure, the molecular chains of the polymers have different lengths or different molecular weights. The polymer used in the process of the present disclosure has a molecular weight ($M_w$) that may be at least 60,000 g/mol, typically 80,000 g/mol to 1,000,000 g/mol, more typically 100,000 g/mol to 400,000 g/mol.

As such, the molecular weights of the polymers result in a distribution. This distribution can be defined by its polydispersity index (PDI). Generally, PDI may be defined as the ratio $M_w/M_n$, wherein $M_w$ is the weight average molecular weight and $M_n$ is the number average molecular weight. Alternatively, PDI may be defined as the ratio $M_z/M_w$, wherein $M_z$ is the Z-average molecular weight or the size average molecular weight. $M_w$, $M_n$, $M_z$ may be determined using methods known to those of ordinary skill in the art. For example, gel permeation chromatography (GPC) may be used. Unless otherwise indicated, PDI will refer to the ratio $M_w/M_n$.

The polymer used in the process of the present disclosure has a polydispersity (PDI) of less than or equal to 2. In an embodiment, the polymer has a PDI of less than or equal to 1.7, typically less than or equal to 1.6.

Spinning of the polymer solution may be achieved by any method known to those of ordinary skill in the art, such as, for example, wet spinning or air gap spinning.

In wet spinning, the dope is filtered and extruded through holes of a spinneret (typically made of metal) directly into a liquid coagulation bath for the polymer to form filaments. The spinneret holes determine the desired filament count of the fiber (e.g., 3,000 capillaries, or holes, for 3K carbon fiber). However, in air-gap spinning, a vertical air gap of 1 to 50 mm, typically 2 to 10 mm, is provided between the spinneret and the coagulating bath. In this spinning method, the polymer solution is filtered and extruded in the air from the spinneret and then the extruded filaments are coagulated in the coagulating bath. In an embodiment, the spinning is conducted with a spinneret having a spinneret size of greater than or equal to 1000 capillaries.

In an embodiment, the spinning of the polymer solution is achieved by air gap spinning.

The coagulation liquid used in the process is a mixture of solvent and non-solvent. The solvent for the polymer refers to any compound capable of dissolving the polymer, typically completely. As used herein, non-solvent refers to any compound that does not dissolve the polyacrylonitrile-based polymer.

The ratio of solvent and non-solvent, and bath temperature are not particularly limited and may be adjusted according to known methods to achieve the desired solidification rate of the extruded nascent filaments in coagulation. However, in an embodiment, the coagulation bath comprises 20 wt % to 85 wt % of one or more solvents, typically 75 wt % to 85 wt % of one or more solvents, the balance being non-solvent.

Water or alcohol is typically used as the non-solvent. Suitable solvents include the solvents described herein. In an embodiment, the one or more solvents is selected from the group consisting of dimethyl sulfoxide (DMSO), dimethyl formamide (DMF), dimethyl acetamide (DMAc), ethylene carbonate (EC), zinc chloride (ZnCl2)/water and sodium thiocyanate (NaSCN)/water.

In an embodiment, the temperature of the coagulation bath is from 0° C. to 80° C., typically from 0° C. to 20° C.

As used herein, the jet stretch ($\Phi_a$) refers to the ratio of the first roller takeup velocity ($V_1$) to the dope extrusion velocity ($V_0$) as defined in the following relation:

$$\Phi_a = V_1/V_0$$

The first roller takeup velocity ($V_1$) is the linear velocity of the first roller immediately following the spinneret and is expressed in meters/minute (m/min). As used herein, the dope extrusion velocity ($V_0$), also expressed in meters/minute, is defined by the following relation:

$$V_0 = (4Q)/(\pi D^2)$$

wherein Q is the volume flow per filament (in m³/min) and D is the diameter (in meters) of each spinneret capillary. The jet stretch, as used in the present disclosure, excludes other types of stretch that may occur at downstream processes after the first roller. Various jet stretches may be attained by changing either $V_1$ or $V_0$. For example, keeping $V_0$ constant, the maximum jet stretch is determined by the maximum takeup velocity. A person of ordinary skill in the art would understand how to adjust any of the aforementioned parameters in order to obtain the jet stretches used in the process without departing from the spirit or scope of the present disclosure.

In an embodiment, the jet stretch is from about 10 to about 20, typically from about 10 to about 15. In another embodiment, the jet stretch is from about 35 to about 50, typically from about 40 to about 50.

In yet another embodiment, the jet stretch is from about 15 to about 60, typically from about 15 to about 50, more typically from about 15 to about 35. In some embodiments, the jet stretch is from about 20 to about 60, from about 25 to about 60, from about 30 to about 60, or from about 35 to about 60.

In an embodiment, the cross-sectional diameter of the one or more carbon fiber precursor fibers produced exiting coagulation is less than or equal to 55 μm, typically less than or equal to 20 μm.

Following the production of the carbon fiber precursor fibers according to the process described herein, the said precursor fibers may be used in a process for producing carbon fibers.

Thus, in the second aspect, the present disclosure relates to a process for producing carbon fibers, the process comprising:
1) producing carbon fiber precursor fibers according to the process described herein;
2) drawing the carbon fiber precursor fibers produced in step 1) through one or more draw and wash baths, thereby forming drawn carbon fiber precursor fibers that are substantially free of solvent; and
3) oxidizing the drawn carbon fiber precursor fibers of step 2) to form stabilized carbon fiber precursor fibers and then carbonizing the stabilized carbon fiber precursor fiber, thereby producing carbon fibers.

The carbon fiber precursor fibers produced according to the process described herein is subjected to a drawing step to form drawn carbon fiber precursor fibers that are substantially free of solvent.

The drawing of the carbon fiber precursor fibers is conducted by conveying the spun precursor fibers through one or more draw and wash baths, for example, by rollers. The carbon fiber precursor fibers are conveyed through one or more wash baths to remove any excess solvent and stretched in hot (e.g., 40° C. to 100° C.) water baths to impart molecular orientation to the filaments as the first step of controlling fiber diameter. The result is drawn carbon fiber precursor fibers that are substantially free of solvent.

The drawing step 2) may further comprise drying the drawn carbon fiber precursor fibers that are substantially free of solvent, for example, on drying rolls. The drying rolls can be composed of a plurality of rotatable rolls arranged in series and in serpentine configuration over which the filaments pass sequentially from roll to roll and under sufficient tension to provide filaments stretch or relaxation on the rolls. At least some of the rolls are heated by pressurized steam, which is circulated internally or through the rolls, or electrical heating elements inside of the rolls. Finishing oil can be applied onto the stretched fibers prior to drying in order to prevent the filaments from sticking to each other in downstream processes.

In step 3) of the process described herein, the drawn carbon fiber precursor fibers of step 2) are oxidized to form stabilized carbon fiber precursor fibers and, subsequently, the stabilized carbon fiber precursor fiber are carbonized to produce carbon fibers.

During the oxidation stage, the drawn carbon fiber precursor fibers, typically PAN fibers, are fed under tension through one or more specialized ovens, each having a temperature from 150 to 300° C., typically from 200 to 280° C., more typically from 220 to 270° C. Heated air is fed into each of the ovens. Thus, in an embodiment, the oxidizing in step 3) is conducted in an air environment. The drawn carbon fiber precursor fibers are conveyed through the one or more ovens at a speed of from 4 to 100 fpm, typically from 10 to 80 fpm, more typically from 20 to 70 fpm.

The oxidation process combines oxygen molecules from the air with the fiber and causes the polymer chains to start crosslinking, thereby increasing the fiber density to 1.3 $g/cm^3$ to 1.4 $g/cm^3$. In the oxidization process, the tension applied to the fiber is generally to control the fiber drawn or shrunk at a stretch ratio of 0.8 to 1.35, typically 1.0 to 1.2. When the stretch ratio is 1, there is no stretch. And when the stretch ratio is greater than 1, the applied tension causes the fiber to be stretched. Such oxidized PAN fiber has an infusible ladder aromatic molecular structure and it is ready for carbonization treatment.

Carbonization results in the crystallization of carbon molecules and consequently produces a finished carbon fiber that has more than 90 percent carbon content. Carbonization of the oxidized, or stabilized, carbon fiber precursor fibers occurs in an inert (oxygen-free) atmosphere inside one or more specially designed furnaces. In an embodiment, carbonizing in step 3) is conducted in a nitrogen environment. The oxidized carbon fiber precursor fibers are passed through one or more ovens each heated to a temperature of from 300° C. to 1650° C., typically from 1100° C. to 1450° C.

In an embodiment, the oxidized fiber is passed through a pre-carbonization furnace that subjects the fiber to a heating temperature of from about 300° C. to about 900° C., typically about 350° C. to about 750° C., while being exposed to an inert gas (e.g., nitrogen), followed by carbonization by passing the fiber through a furnace heated to a higher temperature of from about 700° C. to about 1650° C., typically about 800° C. to about 1450° C., while being exposed to an inert gas. Fiber tensioning may be added throughout the precarbonization and carbonization processes. In pre-carbonization, the applied fiber tension is sufficient to control the stretch ratio to be within the range of 0.9 to 1.2, typically 1.0 to 1.15. In carbonization, the tension used is sufficient to provide a stretch ratio of 0.9 to 1.05.

Adhesion between the matrix resin and carbon fiber is an important criterion in a carbon fiber-reinforced polymer composite. As such, during the manufacture of carbon fiber, surface treatment may be performed after oxidation and carbonization to enhance this adhesion.

Surface treatment may include pulling the carbonized fiber through an electrolytic bath containing an electrolyte, such as ammonium bicarbonate or sodium hypochlorite. The chemicals of the electrolytic bath etch or roughen the surface of the fiber, thereby increasing the surface area available for interfacial fiber/matrix bonding and adding reactive chemical groups.

Next, the carbon fiber may be subjected to sizing, where a size coating, e.g. epoxy-based coating, is applied onto the fiber. Sizing may be carried out by passing the fiber through a size bath containing a liquid coating material. Sizing protects the carbon fiber during handling and processing into intermediate forms, such as dry fabric and prepreg. Sizing also holds filaments together in individual tows to reduce fuzz, improve processability and increase interfacial shear strength between the fiber and the matrix resin.

Following sizing, the coated carbon fiber is dried and then wound onto a bobbin.

A person of ordinary skill in the art would understand that other processing conditions (including composition of the spin solution and coagulation bath, the amount of total baths, stretches, temperatures, and filament speeds) are correlated to provide filaments of a desired structure and denier. The process of the present disclosure may be conducted continuously.

Carbon fibers produced according to the process described herein may be characterized by mechanical properties, such as tensile strength and tensile modulus per the ASTM D4018 test method.

The processes and materials of the present disclosure are further illustrated by the following non-limiting examples.

Example 1

Four polyacrylonitrile-based polymer solutions were evaluated on a bench-scale spinning line. The polymer solutions are shown in Table 1 below.

| Polymer | $M_n$ (g/mol) | $M_w$ (g/mol) | PDI | Solution conc. (wt. % poly) |
|---|---|---|---|---|
| 1 | 105,900 | 165,000 | 1.558 | 23.43 |
| 2 | 90,100 | 184,900 | 2.052 | 22.42 |
| 3 | 102,400 | 155,200 | 1.516 | 22.90 |
| 4 | 81,800 | 188,200 | 2.300 | 23.06 |

The absolute weight-average molecular weight ($M_w$) and polydispersity (PDI) were determined via a Viscotek GPC-max gel permeation chromatography (GPC) equipped with a 270 low-angle light scattering (LALS) and right-angle light scattering (RALS) detectors. Additionally, a viscometer and 2502 refractive index (RI) detector were connected in series. The columns were Malvern I-MBHMW-3078 mixed bed columns set to 45° C. with a mobile phase of 0.02 M LiBr in DMF at a flow rate of 1.0 mL/min. Each injection was 100 μL. The data was analyzed using Viscotek OMNISEC Version 5.0 software.

Viscosity measurements were performed on a Brookfield viscometer using concentric cylinder geometry at 45, 55, and 65° C. at 0.3 rad/sec. Sample sizes ranged from 11 to 12 grams and measurements were recorded after 15 minutes of stabilization.

The DHR-2 rheometer measurements were performed with a 40 mm, 1 degree cone. Frequency sweeps were done at 628 to 0.628 rad/sec and 2% strain. Flow sweeps were done at 0.003 Hz to 100 Hz.

In this example, the jet stretch required to reach "full wipeout" or catastrophic failure of the tow was determined for each polymer solution. "Full wipeout" or catastrophic failure of the tow was considered to be the point where the filaments were married and the entire tow would not reach the turning bar submerged in the coagulation bath. The coagulation bath was set to about 78-79% DMSO with a temperature of 15° C. A 100-filament air gap spinneret having a capillary dimension of 3:1 (L/D) was used with an air gap distance of 6 mm. In each trial, the first roller, or godet, speed started at 5.8 m/min and the volume flow rate was adjusted to be in the range of 1.72-1.8 cc/min initially to target a jet stretch of about 5.7-6.0. The jet stretch was then increased by ramping up the godet speed in step intervals of about 1 m/min to 14.36 m/min (maximum) followed by decreasing metering pump rate in increments of 0.1 cc/min. The run was stopped when the fiber was considered to "fully wipeout" in the jet stretch (i.e. more than 10% filaments break).

The precursor fibers produced were analyzed by optical imaging and scanning electron microscopy (SEM).

The filament diameter was calculated by taking the average of three filaments in SEM and the results are tabulated in Table 2 with the respective jet stretch condition. Table 2 also indicates the maximum jet stretch at break (for each respective sample).

TABLE 2

| Polymer | Low Stretch | | High Stretch | |
| --- | --- | --- | --- | --- |
| | Jet Stretch | Diam (μm) | Jet Stretch* | Diam (μm) |
| 1 | 5.96 | 50.4 | 42.29 | 19.8 |
| 2 | 5.70 | 47.7 | 24.17 | 25.9 |
| 3 | 5.82 | 48.3 | 39.04 | 19.9 |
| 4 | 5.81 | 42.3 | 20.30 | 36.4 |

*jet stretch at break; based on ability of fiber to handle higher stretch

SEM analysis of the cross sections of the precursor filaments at the low jet stretch condition and the respective high jet stretch condition showed that there were macrovoids in the precursor filaments made from Polymers 1-3 at the low stretch condition while the precursor filaments made from Polymer 4 appeared to be free of macrovoids. At the high stretch condition, however, the Polymer 1 and 3 solutions appear to mitigate the macrovoid formation while Polymer 2 appears to form smaller and more frequent voids in the structure. Without wishing to be bound by theory, it is believed that the filament diameter may play a role in the coagulation and the ability to mitigate macrovoids is due to the smaller diameters of these filaments at the higher stretch condition.

Importantly, as shown in Table 4, Polymers 1 and 3, which have PDI of less than 2, can withstand a jet stretch of up to about 40 (42.29 and 39.04, respectively), while Polymers 2 and 4, which do not have PDI of less than 2, could only withstand a jet stretch of up to about 25 (24.17 and 20.30, respectively) at the full wipeout condition. Given that the initial starting viscosities were similar or equal, this property difference in the stretchability in the jet may be exploited in a variety of ways including: higher overall stretch, faster production, lower cost, or easier manufacture of larger tows. It is evident that low PDI solutions, as exemplified by solutions of Polymers 1 and 3, are stable at a jet stretch of about 20, which may enable less downstream stretching to achieve higher performance at lower cost. Moreover, the use of polymers having a PDI of less than or equal to 2 may provide an opportunity for re-designing spinnerets with lower L/D in the capillary so as to have less pressure at the spinneret head.

What is claimed is:

1. A process for producing one or more carbon fiber precursor fibers, the process comprising: spinning a polymer solution comprising a polyacrylonitrile (PAN) polymer having a polydispersity (PDI) of less than or equal to 2 in a coagulation bath with a jet stretch of about 15 to about 60, thereby producing one or more coagulated carbon fiber precursor fibers, wherein spinning of the polymer solution is conducted by air gap spinning with a spinneret having more than 1000 capillaries, the concentration of PAN polymer in the polymer solution is at least 10 wt %, based on total weight of the solution, the coagulation bath comprises 20 wt % to 85 wt % of one or more solvents with the balance being non-solvent and the temperature of the coagulation bath is from 0° C. to 20° C., and the cross-sectional diameter of the coagulated carbon fiber precursor fiber exiting the coagulation bath is less than 55 μ.

2. The process according to claim 1, wherein the jet stretch is from about 35 to about 50.

3. The process according to claim 1, wherein the polydispersity (PDI) of the PAN polymer is less than or equal to 1.7.

4. The process according to claim 1, the polymer comprises repeating units derived from and one or more co-monomers selected from the group consisting of methacrylic acid (MAA), acrylic acid (AA), itaconic acid (ITA), vinyl-based esters, typically, methacrylate (MA), methyl methacrylate (MMA), vinyl acetate (VA), ethyl acrylate (EA), butyl acrylate (BA), ethyl methacrylate (EMA); and other vinyl derivatives, and mixtures thereof.

5. The process according to claim 1, wherein the coagulation bath comprises 75 wt % to 85 wt % of one or more solvents.

6. The process according to claim 5, wherein the one or more solvents is selected from the group consisting of dimethyl sulfoxide (DMSO), dimethyl formamide (DMF), dimethyl acetamide (DMAc), ethylene carbonate (EC), zinc chloride (ZnCl2)/water and sodium thiocyanate (NaSCN)/water.

7. The process according to claim 1, wherein a vertical air gap from 1 to 50 mm is provided between the spinneret and the coagulation bath.

8. The process according to claim 1, wherein the polymer has a molecular weight ($M_w$) of at least 60,000 g/mol.

9. The process according to claim 1, wherein the polymer is synthesized by controlled/living radical polymerization using a Reversible Addition/Fragmentation Chain Transfer (RAFT) agent.

10. A process for producing carbon fibers, the process comprising:

1) Producing the coagulated carbon fiber precursor fibers according to the process of claim 1;
2) drawing the coagulated carbon fiber precursor fibers produced in step 1) through one or more draw and wash baths, thereby forming drawn carbon fiber precursor fibers that are substantially free of solvent; and
3) oxidizing the drawn carbon fiber precursor fibers of step 2) to form stabilized carbon fiber precursor fibers and then carbonizing the stabilized carbon fiber precursor fiber, thereby producing carbon fibers.

* * * * *